(12) United States Patent
Gilbert et al.

(10) Patent No.: US 8,813,796 B2
(45) Date of Patent: Aug. 26, 2014

(54) REUSABLE ADJUSTABLE GIFT WRAP

(76) Inventors: Ivy M. Gilbert, Philadelphia, PA (US); Sarah F. Peoples, Philadelphia, PA (US)

(*) Notice: Subject to any disclaimer, the term of this patent is extended or adjusted under 35 U.S.C. 154(b) by 495 days.

(21) Appl. No.: 13/032,556

(22) Filed: Feb. 22, 2011

(65) Prior Publication Data

US 2012/0145291 A1    Jun. 14, 2012

Related U.S. Application Data

(60) Provisional application No. 61/307,162, filed on Feb. 23, 2010.

(51) Int. Cl.
*B65D 65/02* (2006.01)
*B65D 77/10* (2006.01)

(52) U.S. Cl.
USPC .................. 150/154; 383/71; 24/30.5 R

(58) Field of Classification Search
USPC ............ 150/106, 154; 383/4, 71; 24/30.5 R, 24/30.5 S, 545
See application file for complete search history.

(56) References Cited

U.S. PATENT DOCUMENTS

| | | | | |
|---|---|---|---|---|
| 3,024,824 A * | 3/1962 | Bass | ................................ | 383/4 |
| 3,355,092 A * | 11/1967 | Le Pain | ..................... | 229/87.19 |
| 3,357,070 A * | 12/1967 | Soloan | ............................ | 24/562 |
| 3,775,810 A * | 12/1973 | Smith et al. | ................. | 24/30.5 S |
| 4,305,206 A * | 12/1981 | Roe | .................................. | 33/770 |
| 4,620,396 A * | 11/1986 | Bjorntwedt | ........................ | 52/3 |
| 4,644,610 A * | 2/1987 | Fish | ............................. | 24/30.5 S |
| 4,646,394 A * | 3/1987 | Krauss | ........................ | 24/129 R |
| 4,914,789 A * | 4/1990 | Pedersen | ..................... | 24/30.5 S |
| 5,265,727 A * | 11/1993 | Anderson | ..................... | 206/457 |
| 5,644,799 A * | 7/1997 | Armenta et al. | ............. | 2/209.13 |
| 5,655,225 A * | 8/1997 | Mathers | ........................... | 2/172 |
| 5,947,672 A * | 9/1999 | Cohen | .......................... | 411/525 |
| 6,161,263 A * | 12/2000 | Anderson | ....................... | 24/545 |
| 7,845,112 B2 * | 12/2010 | Felknor | .......................... | 47/65.8 |

* cited by examiner

*Primary Examiner* — Sue A Weaver
(74) *Attorney, Agent, or Firm* — Ked & Associates, LLP

(57) ABSTRACT

A reusable gift wrap and a method of wrapping a gift comprising a sheet of material and a fastener. The sheet has a plurality of corners. The fastener comprises a body fabricated from a resilient material and is attached near one of the corners. A plurality of coterminous radially extending slits are formed in a face of the body and define the edges of a plurality of pivotable flaps and an opening for receiving the other corners of the sheet. The flaps comprises a living hinge which permit each of the flaps to pivot. The flaps increase in thickness from the living hinge to the edge of the flap. The three flaps simulate the appearance of a cuboidal gift box.

10 Claims, 5 Drawing Sheets

REUSABLE ADJUSTABLE GIFT WRAP

CROSS-REFERENCE TO RELATED APPLICATIONS

This application claims priority to U.S. Provisional Pat. Application 61/307,162 filed on Feb. 23, 2010.

STATEMENT REGARDING FEDERALLY SPONSORED RESEARCH OR DEVELOPMENT

The present invention was not developed with the use of any Federal Funds, but was developed independently by the inventors.

BACKGROUND OF THE INVENTION

Gift wrapping paper is customary to use for decorative purposes when giving gifts in the United States as well as many other countries. Typically this paper is used once for each gift. It is estimated that millions of tons of gift wrapping paper are used and thrown away each year in the United States alone. As consumers become more conscious of the environmental impact of their actions there is a need for gift wrapping paper that can be reused. In addition to saving the environmental costs of paper gift wrap, a gift wrap made out of fabric can have an aesthetic benefit and be considered a gift as well. For example, in Japan there is a customary cloth wrap, known as a furoshiki, used in place of gift wrap and for carrying packages. However, the art of furoshiki requires substantial skill, dexterity, and patience to be artfully applied. In fact, the furoshiki requires so much practice and skill that the Japanese Government's Ministry of the Environment drafted a diagram for the twelve or so basic wrapping configurations and posted it on the Ministry's website.

Reusable cloth wraps or bags are known in the art but are not adjustable, not aesthetically pleasing or difficult to use. Cloth wraps for gifts exist but remain sack-like and sloppy and do not conform to the contours of the gift being wrapped. Wraps exist with adhesives or hook-and-loop fasteners, but these tend not to fold sleekly or easily, and would not hold-up to long term use, or typical wear and tear. No wrap currently exists that possesses these three vital characteristics: reusable in the long-term, truly adjustable so as to conform to the gift it wraps, and aesthetically pleasing.

SUMMARY OF THE INVENTION

A reusable gift wrap and a method of wrapping a gift comprising a sheet of material and a fastener. The sheet has a plurality of corners. The fastener comprises a body fabricated from a resilient material and is attached near one of the corners. A plurality of coterminous radially extending slits are formed in a face of the body and define the edges of a plurality of pivotable flaps and an opening for receiving the other corners of the sheet. The flaps comprises a living hinge which permit each of the flaps to pivot. The flaps increase in thickness from the living hinge to the edge of the flap. The three flaps simulate the appearance of a cuboidal gift box.

In one preferred embodiment, the flaps comprise three flaps and the radial slits comprise three slits. The three flaps simulate the appearance of a cuboidal gift box. And, the fastener body has a disk shape.

In another preferred embodiment, the plurality of corners comprises four corners and the opening of the fastener receives the three other corners. The sheet of material is a fabric material, a synthetic material, a metal foil material, or an eco-friendly material.

In yet another preferred embodiment, the fastener and sheet may be sold separately.

BRIEF DESCRIPTION OF THE FIGURES

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
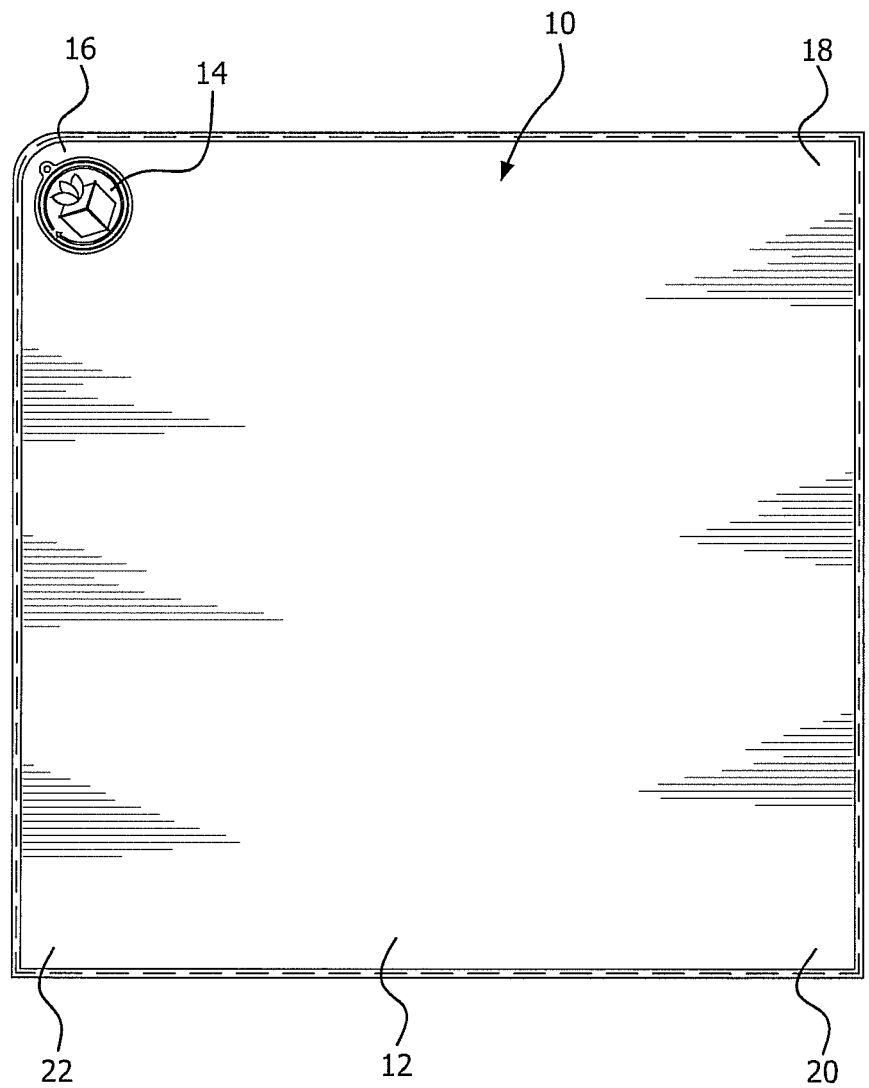
FIG. 1 is a top plan view of the gift wrap article of the present invention.
Figure 3:
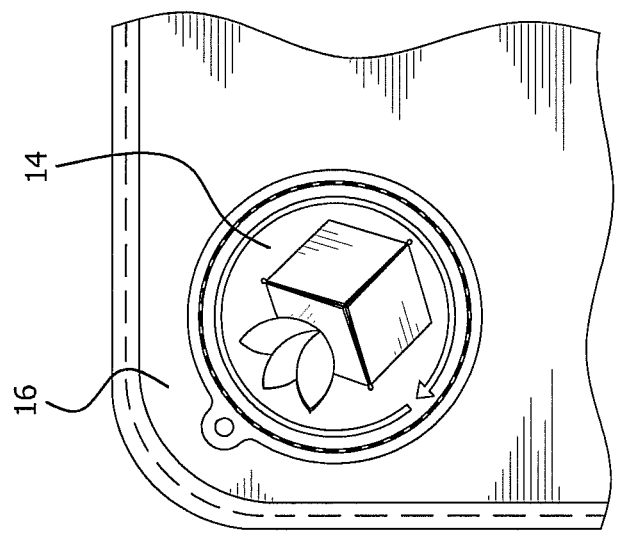
FIG. 3 is an enlarged partial top plan view of one corner of the gift wrap fabric material and the fastener of the invention shown in FIG. 1.
Figure 2:
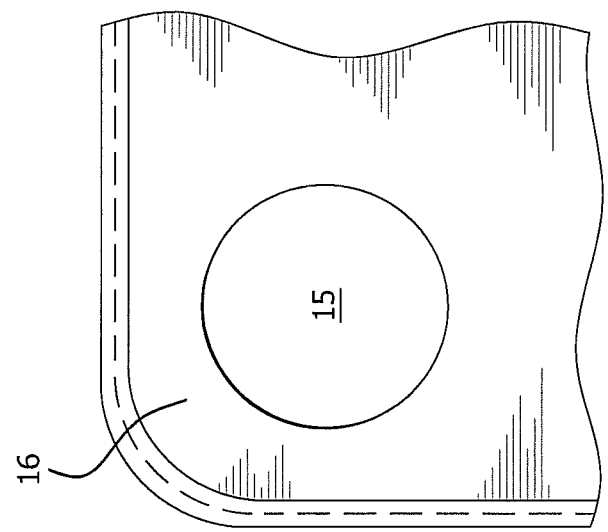
FIG. 2 is an enlarged partial top plan view of one corner of the gift wrap fabric material of the invention shown in FIG. 1.

As shown in the figures, the invention relates to a reusable gift wrap wrap article 10. Referring now to FIGS. 1 through 3, the reusable gift wrap article 10 comprises a sheet of durable fabric material 12, such as wool, cotton, polyester, silk, rayon, felt, neoprene, canvas, leather or other suitable materials and combinations thereof. The sheet 12 may also be made out of synthetic materials such as plastic or even sturdy paper, or in another preferred embodiment out of metallic paper such as aluminum foil. Environmentally friendly cloth may also be used such as bamboo, hemp or sustainable new cloth technology, such as Craylar. Other types of material and combinations of the foregoing are contemplated and are suitable for use and all are intended to be within the scope of this invention.

Figure 7:
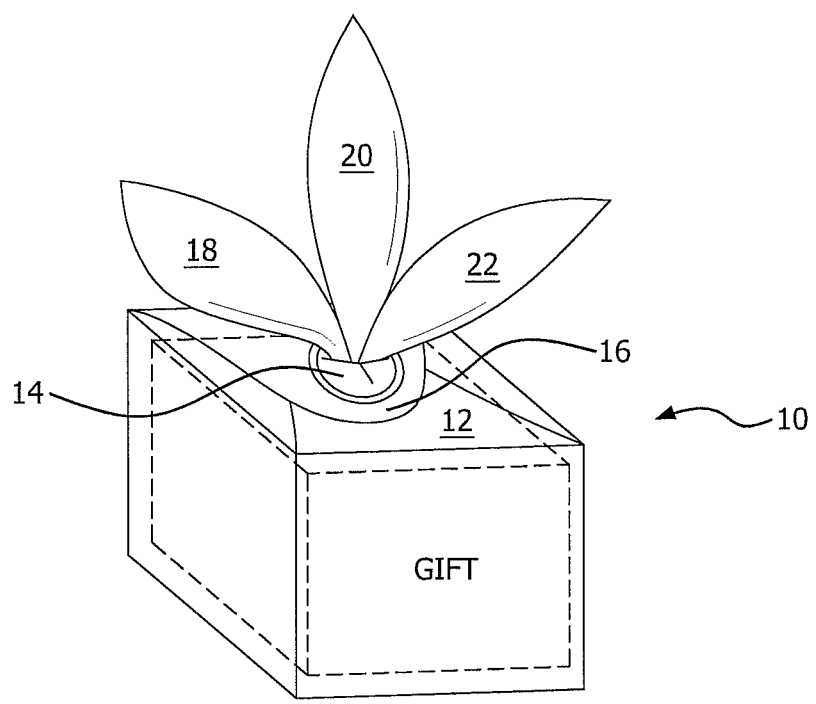
FIG. 7 is a side view of the gift wrap article shown in an in-use position.

The sheet 12 has a preferably rectangular or square shape having corners 16, 18, 20, and 22. The fabric material 12 has the shape such that at least four sides of the cloth are available for folding around a box, such as a gift box or other article, such as shown in FIG. 7. The edge of the fabric sheet material 12 is preferably folded and hemmed with stitching.

The gift wrap article 10 also includes a fastener 14. The fastener is located in corner 16 as shown in FIGS. 1 and 3. In one preferred embodiment, the corner 16 of the sheet 12 with the fastener 14 is radiused and the remaining corners are preferably right angles. It should be understood that corner 16 may be any other suitable shape as the remaining corners 18, 20, and 22.

As best seen in FIG. 2, preferably, a hole 15 is die cut into the corner 16 and the fastener is fastened to the sheet 12 preferably by stitching as shown in FIG. 3; however, it should be understood that other fastener techniques are also suitable, such as by adhesive, ultrasonic welding, and the like, are also suitable and fall within the scope of the invention. Also, the fastener 14 preferably has an indentation around the perimeter designed for stitching the cloth to the fastener 14.

Figure 4:
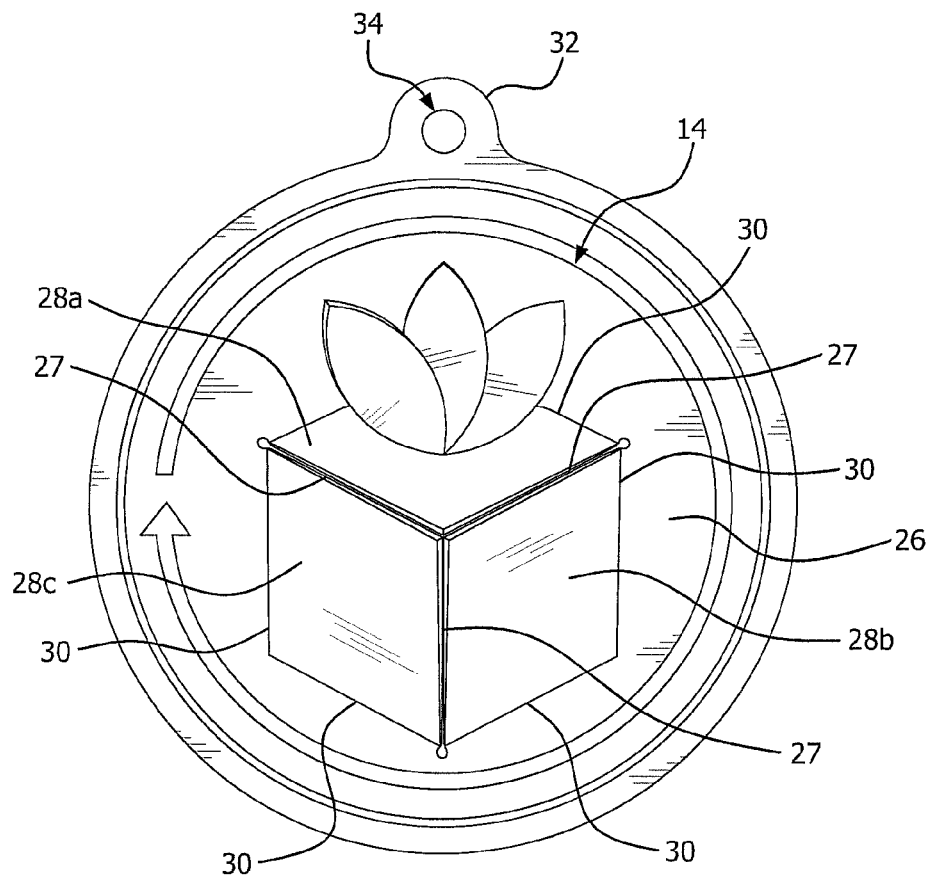
FIG. 4 is a top plan of the fastener of the invention shown in FIG. 1.
Figure 5:
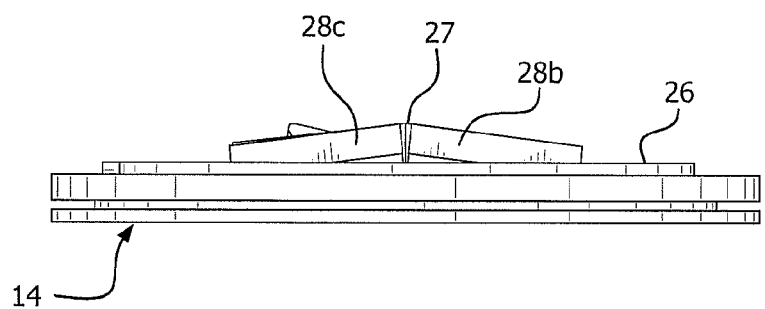
FIG. 5 is a side view of the fastener of the invention shown in FIG. 1.
Figure 6:
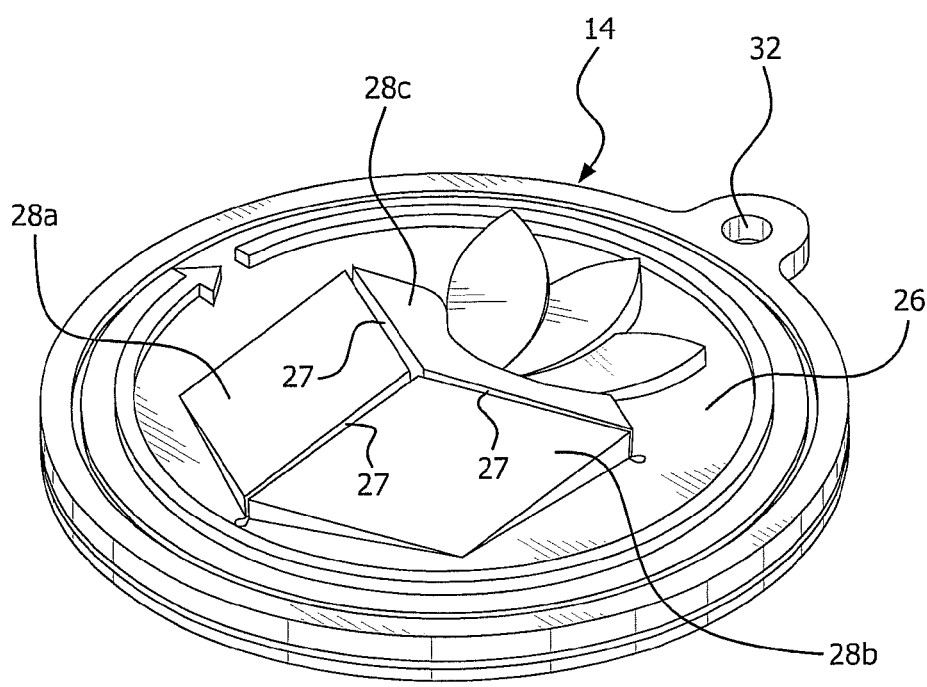
FIG. 6 is an isometric view of the fastener of the invention shown in FIG. 1.

The fastener 14 is best seen in FIGS. 4, 5, and 6 and has a disk-shaped body 26. Other shapes are contemplated and within the scope of the invention, such as other geometric shapes and other ornamental/simulated shapes, such as the shape of a flower or a teddy bear. Three coterminous radial slits 27 extend outwardly from a central point are formed in the body 26. The slits form three flaps 28a, 28b, and 28c. Each flap has a pair of edges formed by two of the slits 27. Opposite these edges are edges 30 which form a living hinge which allows the flaps to pivot. The thickness of each flap increases from the edge 30 to the edges formed at the slits 27 which helps define the living hinge.

The fastener 14 is also preferably fabricated from a soft resilient rubber-like material whose purpose is explained in detail below. The fastener 14 is conceptually similar to the fastener you find on mops, like the Swiffer®, for holding a fabric cleaning sheet on the mop head.

As best seen in FIGS. 4, 5, and 6 the arrangement of slits and living hinges can appear to form the edges of a cube and with the addition of decorative indicia can simulate the appearance of a gift box, thus informing the user of the purpose of the device 10. It should be understood that other shapes and simulated appearances (along with any decorative indicia as needed) of the face of the fastener 14 are contemplated and fall within the scope of the invention.

Also formed on the body 26 is a tab 32 with an opening 34 formed therein for hanging the device 10 on a hook or similar hanger for storing the wrap article 10 when not in use. The tab 32 may also be used to attach accessories, such as pom-poms, bows, or gift tags to the wrap, when the invention is in use as gift wrap.

Referring now to FIG. 7, in order to wrap an article (such as the "Gift"), the aticle is placed on about the center of the sheet 12 and the three corners 18, 20, and 22 of the sheet 12 are taken in hand by the user and drawn through the slits 27 (see FIGS. 4-6) formed in the resilient fastener body 26. This action, pivots the flaps 28a, 28b, and 28c upwardly allowing the three corners to be drawn through the now-enlarged opening formed by the slits. The resilient material also biases the flaps together toward its original flat shape, thus trapping the fabric beyond the three corners in the slit 27. The fabric of corners 18, 20, and 22 thus pulled through the fastener 14 at corner 16 becomes a decorative bow. Also, the increased thickness of the flaps near the slit edges helps to effect this condition.

In this way, all four corners 16, 18, 20, and 22 of the sheet 12 are held together forming a fitted wrap which snugly conforms to the shape of the "gift" within, the bottom of which is positioned on the center of the sheet 12. In this way, the wrap 10 can now be used to hold articles, such as gifts. The gift wrap is easily "unwrapped" or opened by drawing the corners back through the fastener or by reaching into the openings formed by the edges of the sheet and loosening the fabric from the sides.

As previously discussed, the shape of the gift wrap does not need to be square or rectangular, but may take any form that sufficiently wraps a gift or gift box. Other methods of the invention could be used that would enable one to wrap other shaped gifts such as spherical, pyramidal, and other three-dimensional solid shapes; however, square or rectangular type boxes are the most common.

Also the fabrics shown may be any color or design since one of the goals of the invention is having a gift wrap that is aesthetically pleasing.

In another preferred embodiment of the invention, one or more fasteners 14 and one or more sheets 12 or various materials may be sold to the consumer in kit form, i.e., the fasteners 14 would not be attached to the sheets 12 so that the consumer may use his or her own wrapping of various personal, customized, eco-friendly and/or reusable cloth sheets 12. This way the consumer can mix and match the hardware, in various colors, with wrapping in the form of paper or cloth. It is also contemplated that the fastener 14 may be commercialized as a separate article apart from any sheets.

The particular embodiment described herein is provided by way of example and is not meant in any way to limit the scope of the claimed invention. It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

We claim:

1. A reusable gift wrap comprising:
a sheet of material; and
a fastener, the fastener comprising a body and being located near an edge of the sheet, three pivotable flaps being formed in a face of a body of the fastener, defining an opening for receiving part of the sheet, and simulating the appearance of a cuboidal gift box having an ornamental bow, the fastener is formed from a resilient material, the opening is formed by three radially extending slits each extending from a same point, and the flaps comprise a living hinge which permit the flaps to pivot, the flaps increasing in thickness from the living hinge to an opposite edge which forms part of the opening.

2. The reusable gift wrap according to claim 1 wherein the sheet comprises a plurality of corners and wherein the fastener is attached at one of the corners and the opening of the fastener receives at least one of the other corners.

3. The reusable gift wrap according to claim 2 wherein the plurality of corners comprises four corners and the opening of the fastener receives the three other corners.

4. The reusable gift wrap according to claim 2 wherein the sheet of material is a fabric material.

5. The reusable gift wrap according to claim 2 wherein the sheet of material is a synthetic material, a metal foil material, or an eco-friendly material.

6. The reusable gift wrap according to claim 1 wherein the fastener body has a disk shape.

7. A reusable gift wrap comprising:
a sheet of material, the sheet having a plurality of corners; and
a fastener, the fastener comprising a body fabricated from a resilient material, the fastener being attached near one of the corners, a plurality of coterminous radially extending slits being formed in a face of the body and defining edges of a plurality of pivotable flaps and an opening for receiving the other corners of the sheet, the flaps comprising a living hinge which permit the flaps to pivot and wherein the flaps increase in thickness from the living hinge to the edge of the flap, wherein the flaps have a diamond shape, each flap having a pair of first edges that are adjacent to a respective first edge of each adjacent flap, and at least two of the flaps having a living hinge formed on a pair of second edges opposite the first edges of the flap and forming the diamond shape.

8. A reusable gift wrap comprising:
a sheet of material; and a fastener, the fastener comprising a body and being located near an edge of the sheet, and a plurality of pivotable flaps, the pivotable flaps being formed in a face of a body of the fastener defining an opening for receiving part of the sheet, the fastener is formed from a resilient material, the opening is formed by radially extending slits, and the flaps comprise a living hinge which permit the flaps to pivot, wherein the flaps have a diamond shape, each flap having a pair of first edges that are adjacent to a respective first edge of each adjacent flap, and at least two of the flaps having a living hinge formed on a pair of second edges opposite the first edges of the flap and forming the diamond shape.

9. A fastener for a gift wrap comprising:
a fastener body fabricated from a resilient material, a plurality of coterminous radially extending slits formed in a face of the body and defining edges of a plurality of pivotable flaps and an opening, the flaps comprising a living hinge which permits the flaps to pivot and wherein the flaps increase in thickness from the living hinge to the edge of the flap, wherein the flaps have a diamond shape, each flap having a pair of first edges that are adjacent to a respective first edge of each adjacent flap, and at least two of the flaps having a living hinge form on a pair of second edges opposite the first edges of the flap and forming the diamond shape.

10. A fastener for a gift wrap comprising:
a fastener body fabricated from a resilient material, a plurality of coterminous radially extending slits formed in a face of the body and defining edges of a plurality of pivotable flaps and an opening, the flaps comprising a living hinge which permits the flaps to pivot and wherein the flaps increase in thickness from the living hinge to the edge of the flap, wherein the flaps comprise three flaps and wherein the radial slits comprise three slits, and wherein the three flaps simulate the appearance of a cuboidal gift box having an ornamental bow and wherein the fastener body has a disk shape.

* * * * *